United States Patent [19]
Celeste et al.

[11] Patent Number: 5,536,592
[45] Date of Patent: Jul. 16, 1996

[54] GALVANIC BATTERY WITH REPLENISHABLE ELECTRODES AND/OR ELECTROLYTE FOR EXTENDED BATTERY OPERATION

[75] Inventors: Salvatore A. Celeste, Peabody; Anthony J. Cucinotta, Wakefield, both of Mass.; Guy A. Rossi, Hampton, N.H.

[73] Assignee: Biocybernetics Laboratories, Inc., Danvers, Mass.

[21] Appl. No.: 231,744

[22] Filed: Apr. 25, 1994

[51] Int. Cl.$^6$ ..................................................... H01M 6/38
[52] U.S. Cl. ............................... 429/68; 429/113; 429/127
[58] Field of Search .................................. 429/68, 69, 72, 429/110, 113, 116, 52, 127; 242/67.2

[56] References Cited

U.S. PATENT DOCUMENTS

| | | | |
|---|---|---|---|
| 3,293,080 | 12/1966 | Gruber et al. | 429/68 |
| 3,357,864 | 12/1967 | Huber | 429/113 |
| 3,379,574 | 4/1968 | Grulke et al. | 429/116 |
| 3,432,354 | 3/1969 | Jost | 136/86 |
| 3,494,796 | 2/1970 | Grulke et al. | 136/83 |
| 3,536,535 | 10/1970 | Lippincott | 136/86 |
| 3,551,208 | 12/1970 | Stachurski | 429/68 X |
| 3,577,281 | 4/1969 | Pountney et al. | 136/6 |
| 3,592,698 | 7/1971 | Hideo Baba | 429/68 X |
| 3,725,131 | 4/1973 | Pountney et al. | 136/86 |
| 4,145,482 | 3/1979 | Von Benda | 429/27 |
| 4,349,615 | 9/1982 | Reitz | 429/110 |
| 4,916,036 | 4/1990 | Cheiky | 429/127 |

*Primary Examiner*—Anthony Skapars
*Attorney, Agent, or Firm*—Eugene Lieberstein

[57] ABSTRACT

The galvanic battery of the present invention supplies the anode and/or cathode from an elongated strip of flexible tape preferably interconnected through a strip of inactive material functioning as a leader for said tape and for separating the tape entering the electrochemically active compartment of the battery housing from spent tape exiting the electrochemically active compartment. The battery is preferably constructed to include a supply reel having a rotatable core upon which said strip of tape is wound in a cylindrical configuration with the inner winding of tape extending from said core and being threaded through said electrochemically active compartment before being connected back into the electrochemically inactive compartment and wound as the outer winding around the core of the supply reel.

21 Claims, 7 Drawing Sheets

GALVANIC BATTERY WITH REPLENISHABLE ELECTRODES AND/OR ELECTROLYTE FOR EXTENDED BATTERY OPERATION

FIELD OF THE INVENTION

This invention relates to the construction of a galvanic battery in which the anode and/or cathode are supplied from an elongated strip of tape connected to form an endless loop and arranged in segmented sections to provide discrete periods of battery operation separated by controlled periods of dormancy in battery operation.

BACKGROUND OF THE INVENTION

Battery systems using a thin flexible tape of electrode material have been suggested in the prior art for supplementing or replenishing the supply of electrode as the anode electrode is consumed to prolong the life of the battery. An example of a system employing an elongated tape of anode material fed from a supply reel to a take up reel is disclosed in U.S. Pat. No. 4,916,036. The anode described in this patent is supplied from an elongated tape composed of a reactive metal such as lithium wound on a reel and fed from a first chamber through a second reaction chamber containing a solution of electrolyte and cathode to a third chamber in which the tape is wound on a take up reel. The take up reel is driven by a motor under the control of a controller to advance the tape, preferably continuously, through the bath of electrolyte. A continuous fresh supply of anode material is intended to prolong the operation of the battery. Another battery system using a strip of tape containing segments of individual battery cells is taught in U.S. Pat. No. 3,494,796. In this patent each battery cell is composed of its own anode and cathode separated by a layer impregnated with electrolyte. The tape is advanced so that an external pair of collector plate's makes contact with each cell in succession. Thus only one cell at a time is connected to the terminals for heavy discharge while the other cells are held in reserve and discharge at a low level. U.S. Pat. No. 3,577,281 is yet another prior art teaching using an elongated tape coated with an anode material which is driven into a solution of electrolyte.

The commonality between these galvanic battery systems is the use a tape or strip of anode material fed from a reel primarily to supplement the availability of anode material. This is intended to provide a high energy density to weight ratio and to yield higher battery efficiency using a minimum amount of space. The storage life of the battery and its discharge capacity in all such prior art arrangements is fixed although the battery may be discharged at a variable rate over selected intervals of time according to usage.

The galvanic battery cell of the present invention is constructed to provide operator control over the introduction and replenishment of the supply of electrode material and to provide, when necessary, a supplemental supply of electrolyte to extend the storage life of the battery for an extended period. This is accomplished by using an elongated tape having segmented sections of electrode material to provide discrete periods of operation with indefinite periods of dormancy during which the battery remains inactive. In a preferred embodiment of the invention battery operation is initiated by controlling the introduction of the anode to the electrolyte compartment of the battery housing using a strip of inactive material connected to the elongated tape in the form of a leader. The leader permits the tape containing the sections of anode material to be introduced into the electrolyte under the control of the operator. Accordingly, the battery does not begin to discharge until the battery is actually placed in use which substantially increases the storage life of the battery. In the preferred embodiment of the invention the leader performs the dual function of initiating battery operation and separating the spent anode tape electrode from the fresh anode tape.

The battery of the present invention also provides for a period of controlled dormancy between the introduction of each of the segmented sections of anode material into the electrolyte compartment thereby extending battery operation for an indefinite time period under the control of the operator.

Moreover in accordance with the preferred embodiment of the present invention the housing of the battery is constructed with only two compartments one of which is "electrochemically active" and the other of which is "electrochemically inactive". An electrochemical reaction between the anode, cathode and electrolyte occurs in the "electrochemically active" compartment. The "electrochemically inactive" compartment contains a supply of anode material which is fed to the electrochemically active compartment to operate the battery. The anode material is supplied from an elongated strip of tape which is preferably interconnected to form an endless loop. The tape also contains a strip of inactive material arranged within the endless loop to function as a leader for the tape to control activation of the battery at the outset of battery operation. Unused or spent anode material from the electrochemically active compartment is returned to the inactive compartment where it is wound on a common spool with the tape of fresh anode material using the leader of inactive material to separate the fresh anode material from the spent anode. This simplified construction permits the battery cell configuration of the present invention to be light in weight and to exhibit a higher performance efficiency and a higher energy density to weight ratio relative to any known prior art battery construction of comparable size and capacity.

SUMMARY OF THE INVENTION

In one embodiment of the present invention the galvanic battery system comprises a housing having a single electrochemically active compartment with a source of electrolyte and a single electrochemically inactive compartment comprising a supply of anode material in the form of an elongated strip of flexible tape interconnected as an endless loop, a supply reel having a rotatable core upon which said strip of tape is wound in a cylindrical configuration with an inner winding of said tape contiguous to said core extending outwardly from said core and connected back to said tape as the outer winding of said endless loop, with said tape extending from said inner winding to said outer winding being threaded through said electrochemically active compartment before being connected back as the outer winding of said tape and means for controllably rotating said core to sequentially advance said tape through said electrochemically active compartment.

In another embodiment of the present invention the galvanic battery system of the present invention comprises an electrochemically active compartment containing a source of an electrolyte, a cathode and an electrochemically inactive compartment with said electrochemically inactive compartment comprising an elongated strip of flexible tape, a source of anode material on said tape in an arrangement forming discrete segments of anode material, means for separating each segment from one another and means for advancing said strip of flexible tape through said electrochemically active compartment such that each segment of anode material is sequentially advanced into said electrochemically active compartment to provide controlled periods of dormancy between the introduction of each anode segment.

BRIEF DESCRIPTION OF THE DRAWINGS

Other objects and advantages of the present invention will become apparent from the following detailed description of the invention when read in conjunction with the accompanying drawings of which.

DETAILED DESCRIPTION OF THE INVENTION

Figure 1:
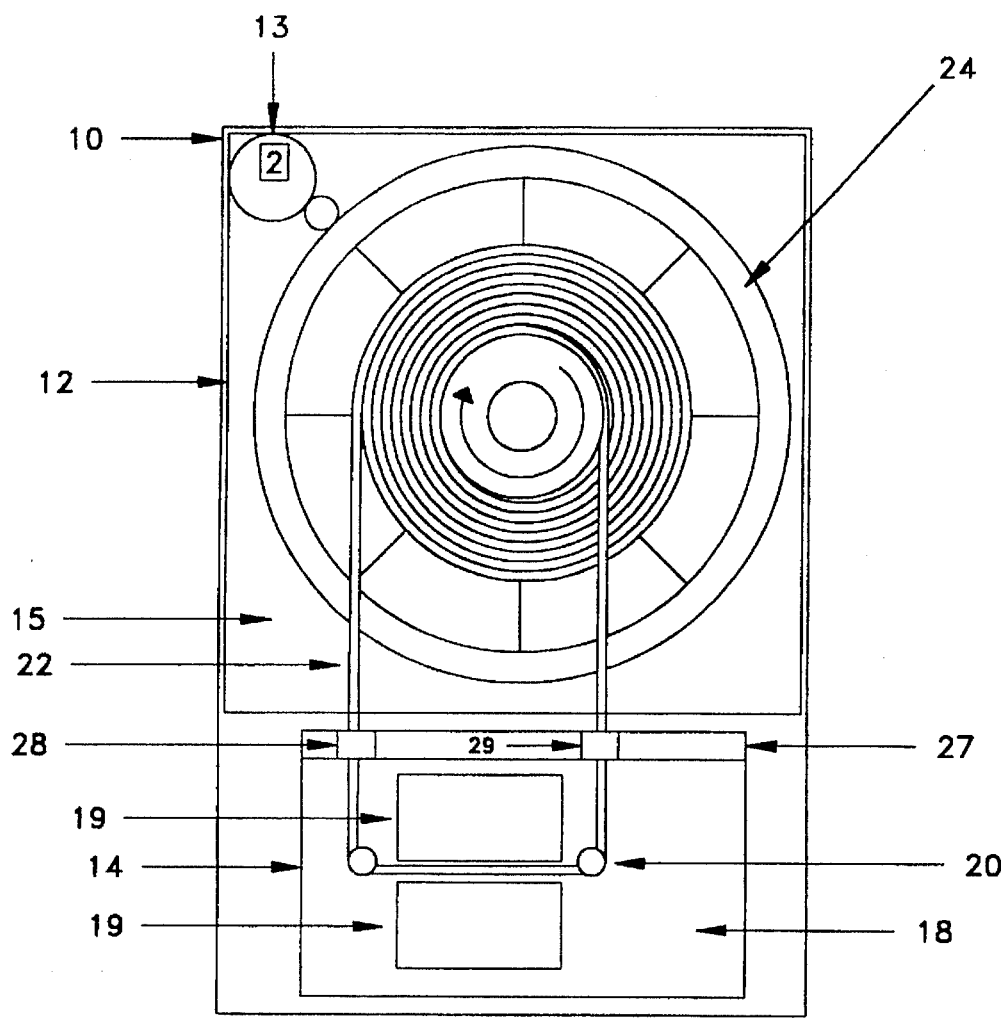
FIG. 1 is a schematic of the battery system of the present invention for illustrating the concept of the invention.

The battery 10 as shown in FIG. 1 is constructed with a common housing 12 containing a single electrochemically active compartment 14 and a single electrochemically inactive compartment 15. The electrochemically active compartment 14 contains an aqueous source of electrolyte 18, a cathode 19 and a plurality of rollers 20 about which an elongated strip of flexible tape 22 is threaded for selective advancement from the electrochemically inactive compartment 15 through the electrochemically active electrolyte compartment 14. The strip of flexible tape 22 contains the supply of anode material for the battery 10 and may include a supplemental source of electrolyte 18 and/or a supply of cathode. Alternatively, the cathode 19 may be located in the electrochemically active compartment 14 as a solid and/or particulate member or may be a stationary air permeable electrode (not shown).

The strip of flexible tape 22 is stored on a single rotatable supply and take up reel 24 located in the electrochemically inactive compartment 15 of the housing 12. In addition to the rotatable supply and take up reel 24 the electrochemically inactive compartment 15 contains a conventional counter 23 for measuring each revolution of the tape 22 as it is advanced through the electrochemically active compartment 14 and a mechanism 25, as diagrammatically illustrated in FIG. 7, for sequentially advancing the rotatable reel 24 under manual or electronic control of an operator. The mechanism 25 may be, for example, a simple mechanical rotary dial for manually rotating the reel 24 or any other mechanical mechanism such as a conventional ratchet mechanism (not shown). Alternatively an electronic motor control means (not shown) may be used for advancing the tape 22.

The electrochemically inactive anode compartment 15 is separated from the electrochemically active compartment 14 by a divider 27 and a pair of wipers 28 and 29 respectively. The wipers 28 and 29 function to wipe the tape 22 on ingress to the active electrolyte compartment 14 and on egress therefrom. The wipers 28 and 29 may be composed of any durable flexible material preferably an elastomeric material to provide a substantial degree of isolation between the two compartments 14 and 15 but not necessarily to seal the two compartments from one another. The primary function of the wipers 28 and 29 is to prevent excessive build up of electrolyte on the anode tape 22 and to wipe off electrolyte residue from the spent anode tape 22 withdrawn from the inactive anode compartment 15. Separation of the compartments 14 and 15 is more ideally accomplished in accordance with the present invention by the construction of the flexible tape 22 as will hereafter be explained in detail.

Figure 2:
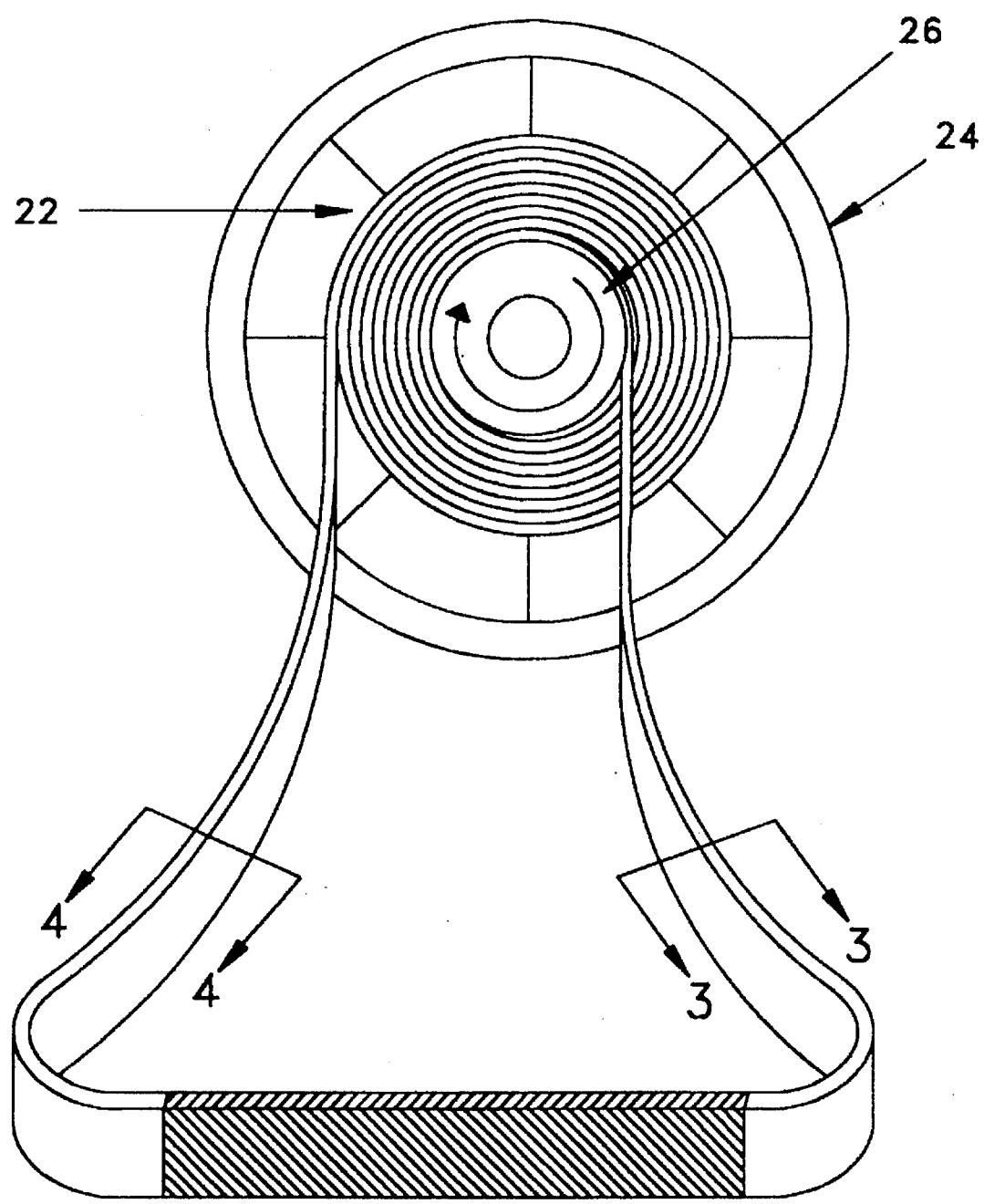
FIG. 2 is an enlarged perspective view of the flexible anode tape and reel assembly of FIG. 1 showing the preferred cylindrical winding arrangement for the flexible tape so that the inner winding is connected to the outer winding to form an endless loop and also showing a leader for separating the spent anode tape from the active anode tape.

The flexible tape 22 should preferably be interconnected to itself to form an endless loop as is shown in FIG. 2 with a strip of inactive material 30 of predetermined length in the endless loop serving as the leader for the tape 22. The flexible tape 22 is cylindrically wound around a core 26 of the supply reel 24 with the inner winding thereof extending outwardly from the core 26 and looped back to form the outer winding of the endless loop of tape 22. The core 26 is advanced mechanically or electrically as earlier explained until the strip of inactive material 30 is part of the tape 22 which extends outwardly from the core 26. The extended portion of tape 22 is threaded through the set of wipers 29 into the active electrolyte compartment 14 and around the idler rollers 20 where it is then passed through the second set of wipers 28 back to the supply reel 24. Any material which will not react in the electrolyte compartment 14 may be used as the strip of inactive material 30 including a composition of plastic, composite or ceramic. The strip 30 serves a dual function both as a leader for the tape 22 to activate the battery 10 under the control of the operator and for separating fresh anode tape 22 fed from the anode compartment 15 from the spent anode tape 22 returned to the supply reel 24. The battery 10 will remain dormant until the strip of inactive material 30 is passed out of the active compartment 14 and a section of the tape 22 containing a section of anode material is fed into the active compartment. To accomplish this when using a single reel 24 both as a supply reel and a take up reel it is necessary to employ a minimum length of tape 22. The minimum length of tape 22 necessary to separate the unused fresh anode material from the spent tape on the single reel 24 should equal πD where D represents the outer diameter of the cylindrical winding of flexible tape 22.

Figure 3:
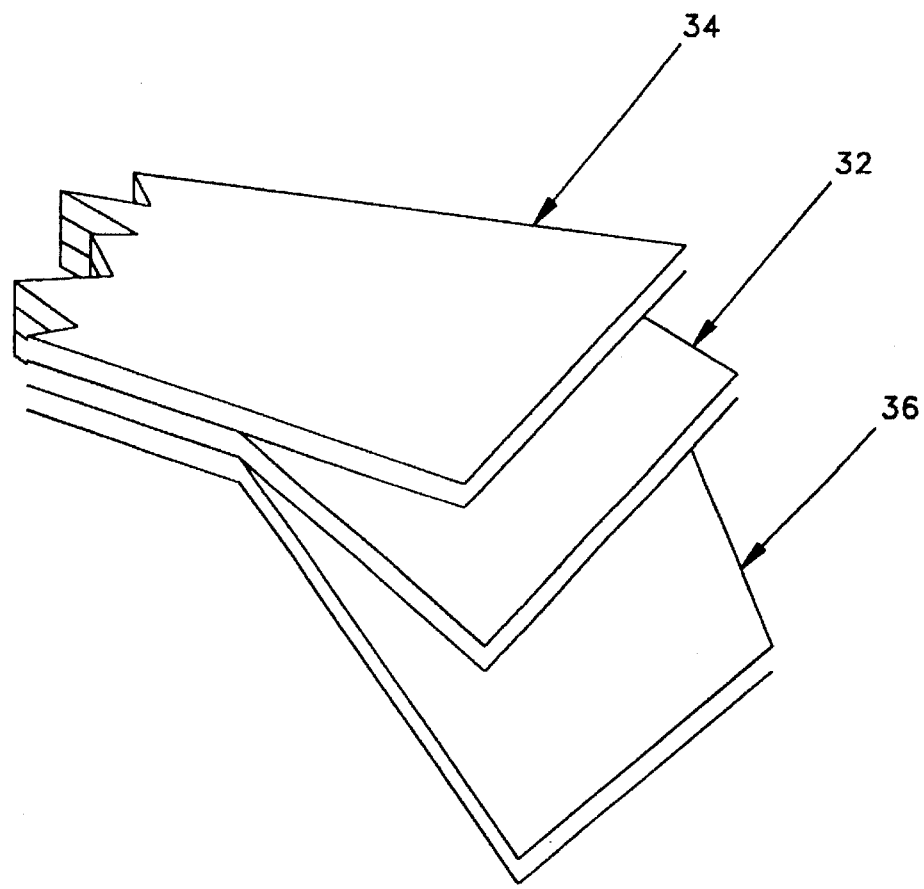
FIG. 3 is a diagrammatic perspective view of a section "L" of the flexible anode tape taken along the lines 3—3 of FIG. 2 showing the flexible tape as a laminated composite.

The tape 22 may be composed of a layer of a porous or non-porous substrate material 32 as shown in FIG. 3 with a superimposed anode layer 34 of any desirable anode material such as zinc, aluminum, magnesium etc. as is well known to those skilled in the art. Accordingly, the anode can be a single metal or a metal alloy or combination thereof. A cathode layer 36 may, if desired, be superimposed on the opposite side of the substrate 32. The cathode layer 36, may likewise be of a single material such as manganese dioxide or a composite. Although the tape 22 may be formed as a laminated composite, as is shown in FIG. 3, the tape configuration is not limited to a laminated configuration. The layers may, for example, be coated on the substrate 32. In fact a braided or woven arrangement may be used for the anode and substrate as well as for the optional cathode layer 36. The cathode layer 36 is optional since a supply of cathode 19 may be directly incorporated into the active compartment 14 or may be a stationary air permeable electrode. The composition of the electrolyte will necessarily be selected based upon the selection of the anode and cathode as is well known to those skilled in the art.

The selected configuration for the tape 22 will determine the method of segmentation of anode sections to provide control over the period of electrochemical inactivity in the active electrolyte compartment 14 i.e. the duration of battery dormancy. Dormancy is controlled by the absence of a supply of anode material to the electrolyte compartment 14 or the absence of a supply of supplemental electrolyte.

Figure 4:
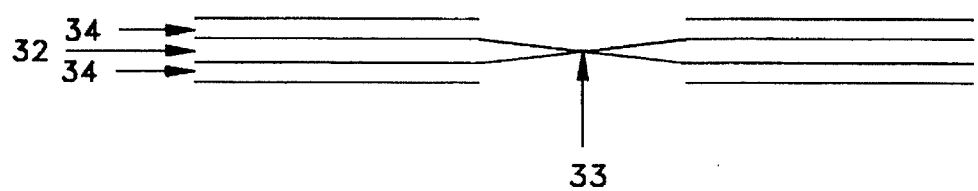
FIG. 4 is an alternate embodiment of the construction of the flexible tape of the present invention taken along the lines 4—4 of FIG. 3.
Figure 5:
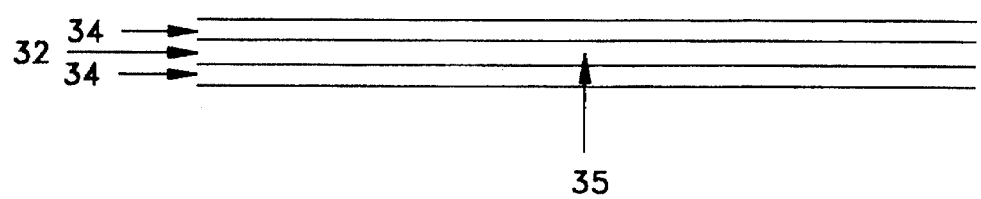
FIG. 5 is another embodiment of the flexible tape of the present invention shown in longitudinal cross section taken along the same direction as that of FIG. 4.
Figure 6:
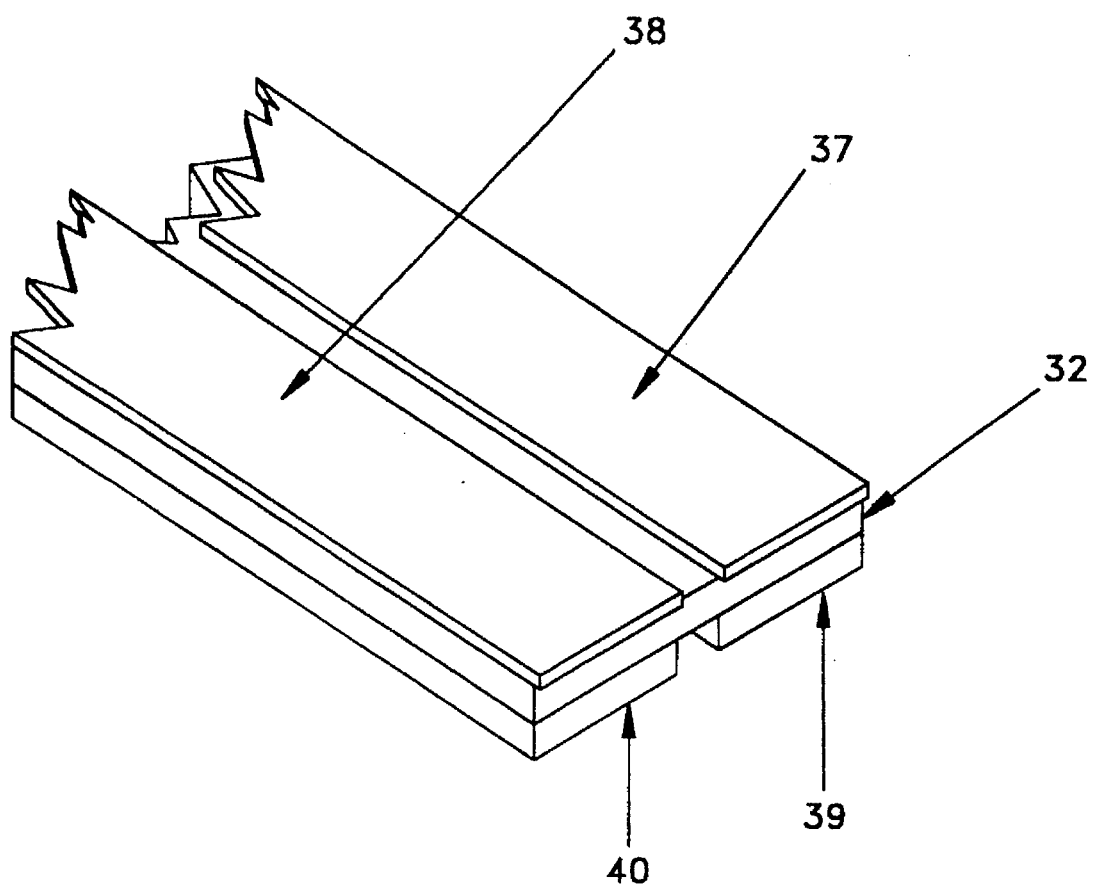
FIG. 6 is a perspective view of an even further embodiment of the construction of the flexible tape of the present invention showing several independent lengthwise strips of anode on a single substrate.

FIG. 4 illustrates one configuration of the tape 22 in which the anode layer 34 is segmented into separate anode sections 34 spaced apart on the substrate 32 so that only one section 34 of anode material at a time may be introduced into the active compartment 15. This can be controlled by the mechanism 25 used to advance the tape 22 and is particularly suited to use of a mechanical ratchet mechanism 25 or an electronic type of advancement mechanism using a motor (not shown). Once one section 34 of anode material is consumed in the active compartment 14 the battery is rendered inactive or dormant until another section 34 of anode material is advanced into the active compartment 14. The substrate 32 may be composed of any material composition which will not be consumed in the electrochemically active compartment 14 such as, e.g., polyester, polypropylene or graphite. A porous substrate 32 is preferred so that supplemental electrolyte 18 may be stored in the substrate 32 and introduced into the active electrolyte compartment 14 as the tape 22 is advanced therethrough. Alternatively supplemental electrolyte 18 may be coated on the substrate as a separate layer. The supplemental electrolyte 18 should be dry or encapsulated so as not to be active outside of the compartment 14. To prevent absorption of electrolyte from the active electrolyte compartment 14 into the porous substrate 32 by capillary wicking the substrate 32 can be reduced to a pinch point source at a location 33 between the electrode sections 34. Alternatively, wicking can be prevented by incorporating a wax or other organic material to densify the locations 33. An alternative configuration for tape 22 is shown in FIG. 5 in which the anode layer 34 is continuous but the substrate 32 is represented by segmented sections 32 separated by voids 35 or densified areas. A tape configuration using an arrangement of a plurality of continuous anode layers 37 and 38 laterally separated from one another on a single substrate 32 is shown in FIG. 6. Multiple cathode layers 39 and 40 may likewise be longitudinal arranged on the substrate 32.

Figure 7:
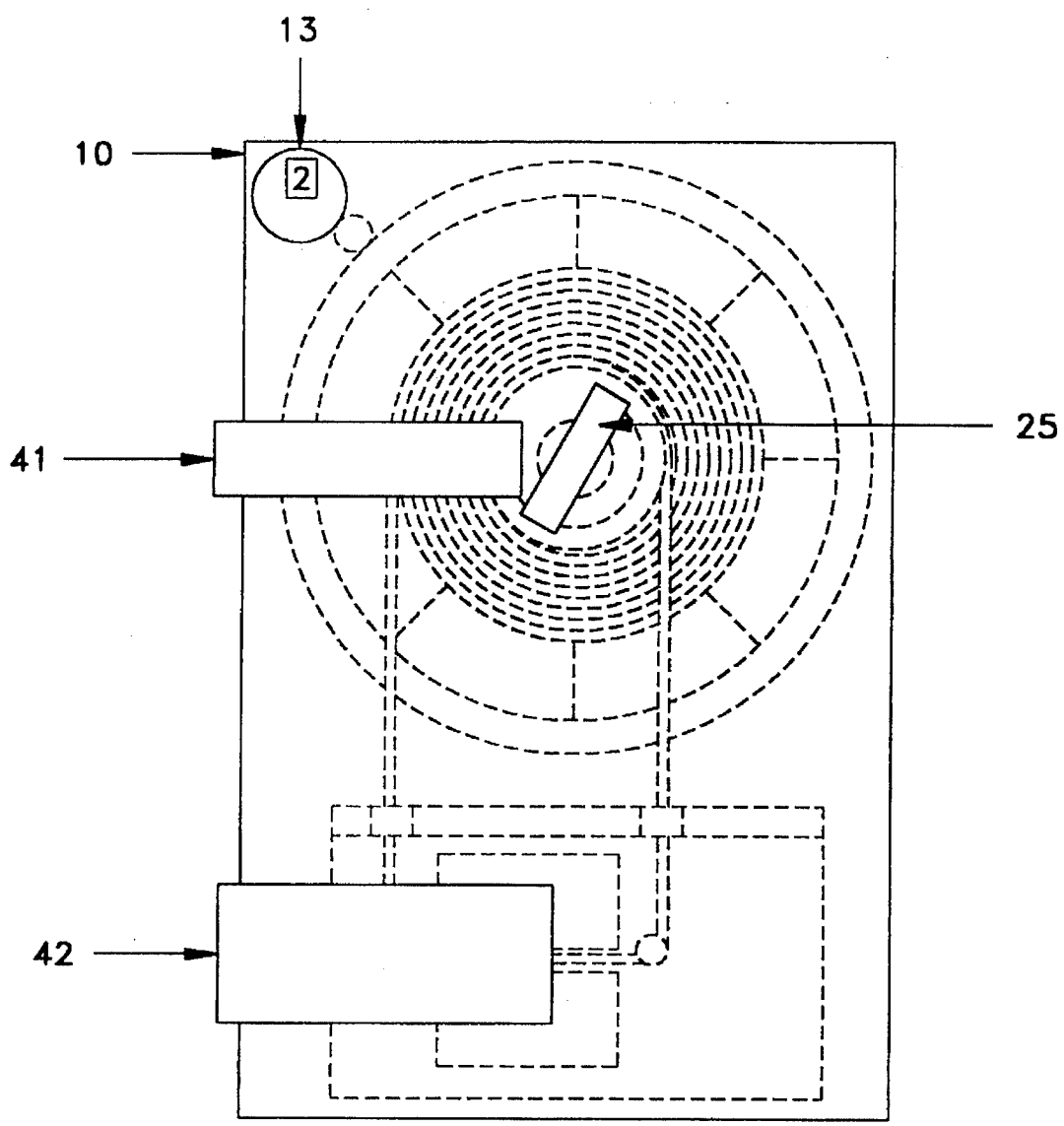
FIG. 7 is a diagrammatic view of the battery assembly of FIG. 1 showing the terminal contact connections for the battery and a mechanical connection for winding and unwinding the reel of FIG. 1.
Figure 8:
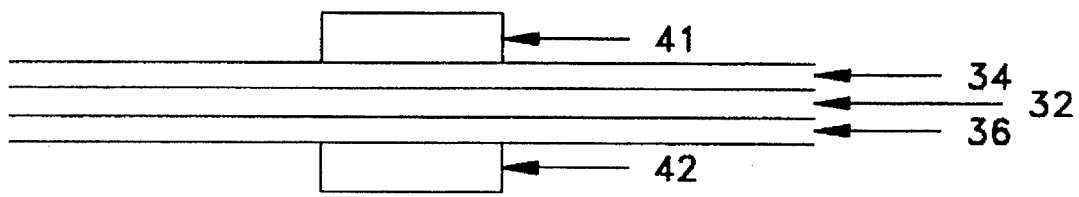
FIG. 8 shows one typical connection for the flexible tape of the present invention to the contact terminal connections of the battery.
Figure 9:
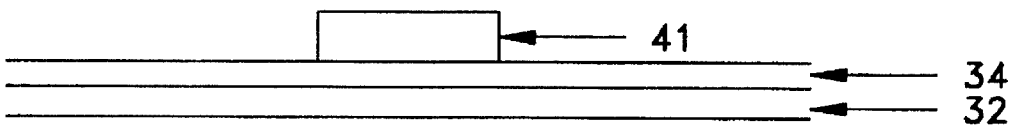
FIG. 9 shows another typical connection for the flexible tape of the present invention to the contact terminals when the tape does not include a cathode layer.
Figure 10:
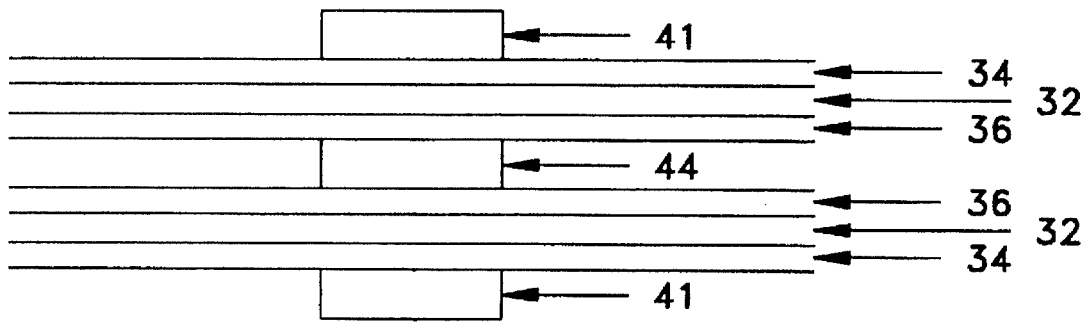
FIG. 10 shows an electrical arrangement for connecting the multiple anode strips of flexible tape in the embodiment of FIG. 6 to the terminals of the battery.

The battery 10 may include contact terminals 41 and 42 as shown in FIG. 7. An arrangement for connecting the contact terminals 41 and 42 to the anode layer 34 and cathode layer 36 is shown in FIG. 8. An alternative arrangement for connecting the contact terminals 41 and 42 to the anode layer 34 for use with no cathode layer 36 is shown in FIG. 9. In the latter case the contact terminal 42 would be directly connected to the cathode 19 in compartment 14. The multiple anode and cathode arrangement shown in FIG. 6 may be connected to the contact terminals 41 and 42 as shown in FIG. 10 using a common third terminal 44 serving as a normal or ground terminal to provide a parallel output which will permit multiple electrical contact points and multiple voltages from a single battery cell 10.

Figure 11A:
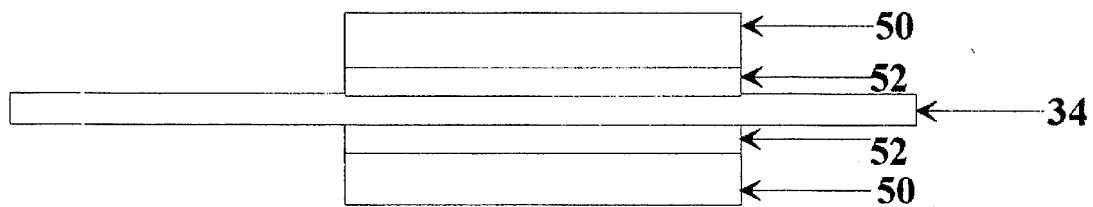
FIG. 11(a) is a diagrammatic view of an alternate embodiment of the electrochemically active compartment of the battery housing of FIG. 1 for a single anode layer tape arrangement.
Figure 11B:
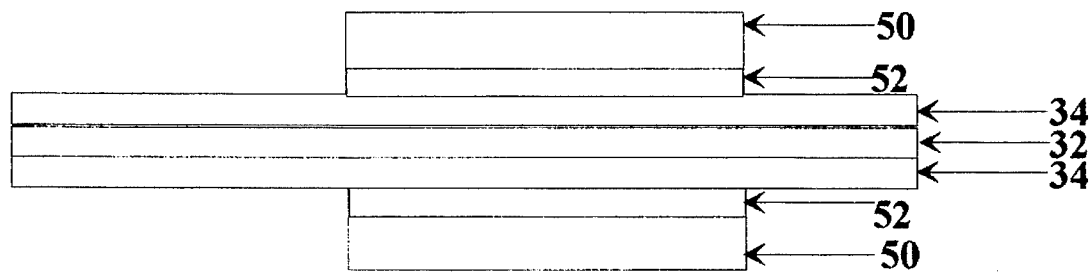
FIG. 11(b) is another diagrammatic view similar to FIG. 11(a) for a double anode layer arrangement.

The active electrolyte compartment 14 may include the source of electrolyte 18 and cathode 19 in one or a plurality of separate electrolyte chambers 50 containing a porous permeable or semipermeable membrane 52 extending from the chamber 50 and arranged to contact the anode layer 34 on the tape 22 as shown in the embodiments of FIG. 11(a) and 11(b) respectively. The use of a semi-permeable membrane 52 provides maximum surface area exposure between the electrolyte and anode for an electrochemical reaction. FIG. 11(a) shows the semi-permeable membrane 52 connected to a single anode layer 34 whereas FIG. 11(b) shows a double anode layer arrangement. The electrolyte chamber 50 may also be used to provide supplemental electrolyte 18 into the active compartment 14 in the configuration of FIG. 1. In the latter arrangement the function of the membrane 52 is to permit ion transfer from a solution of higher concentration of electrolyte ions to migrate to a lower concentration. As an example assume the electrolyte solution contained 20 to 45% by weight aqueous potassium hydroxide "KOH". To replenish the solution with fresh ions of potassium and hydroxide the chamber 50 may contain a saturated solution of e.g. between 45 to 50% KOH thereby maintaining a constant supply of electrolyte to replenish the electrolyte solution as it is depleted during battery operation. The supplemental electrolyte may of course be otherwise provided from dry or encapsulated material impregnated on the tape 22 as explained earlier.

The operational sequence of the battery 10 involves winding the tape 22 on the reel 24 so that the strip of inactive material 30 is initially located in the active compartment 14 of the battery housing 12. In this position the battery 10 is dormant until the tape 22 is advanced under the control of an operator. The tape 22 is preferably advanced intermittently so that only one anode section 34 is physically present in the active compartment 14 at a time. When the material in one anode section 34 of the tape 22 is fully consumed the battery 10 is rendered dormant until the tape 22 is again advanced. Their is no time limit to the period of dormancy between advancing intervals unless the tape is advanced automatically by a controller (not shown).

What is claimed:

1. A galvanic battery comprising a housing having a single electrochemically active compartment including a source of electrolyte and a single electrochemically inactive compartment with said electrochemically inactive compartment comprising a supply of anode material in the form of an elongated strip of flexible tape interconnected as an endless loop, a supply reel having a rotatable core upon which said strip of tape is wound in a cylindrical configuration to form an inner winding and an outer winding with said inner winding extending outwardly from said core and being connected back to said tape as said outer winding thereof, with the inner winding of tape extending from said core being threaded through said electrochemically active compartment before being connected back as said outer winding and means for controllably rotating said core to sequentially advance said tape through said electrochemically active compartment.

2. A galvanic battery as defined in claim 1 wherein said flexible tape further comprises a strip of inactive material interconnecting said tape within said endless loop with said strip of inactive material functioning as a leader for said tape and for separating the tape entering the electrochemically active compartment from spent tape exiting the electrochemically active compartment.

3. A galvanic battery as defined in claim 2 wherein said flexible tape has a minimum length equal to πD where D represents the outer diameter of the cylindrical winding of flexible tape around said core.

4. A galvanic battery as defined in claim 3 wherein said flexible tape comprises a substrate and an anode electrode.

5. A galvanic battery as defined in claim 4 wherein said anode electrode comprises multiple sections supported by said substrate to form discrete anode segments.

6. A galvanic battery as defined in claim 4 wherein said anode electrode comprises at least two strips laterally spaced apart for providing plural voltages.

7. A galvanic battery as defined in claim 4 wherein said anode electrode is continuous and said substrate is segmented into sections.

8. A galvanic battery as defined in claim 7 wherein said substrate has porous sections separated by nonporous sections.

9. A galvanic battery as defined in claim 8 wherein said porous sections of said substrate contain supplemental electrolyte.

10. A galvanic battery as defined in claim 7 wherein said nonporous sections of said substrate contain voids.

11. A galvanic battery as defined in claim 7 wherein said nonporous sections of said substrate contain a dense material such as wax.

12. A galvanic battery as defined in claim 3 wherein said flexible tape comprises a substrate, an anode electrode and a cathode electrode with said substrate separating said anode electrode from said cathode electrode.

13. A galvanic battery as defined in claim 4 further comprising contact terminals for contacting the anode material on said flexible tape.

14. A galvanic battery as defined in claim 13 wherein said electrochemically active compartment comprises an electrolyte chamber containing a permeable membrane extending from said chamber for contacting said anode material.

15. A galvanic battery as defined in claim 13 wherein said electrochemically active compartment comprises an electrolyte chamber containing a permeable membrane separating said active compartment from a high concentration electrolyte solution for supplying supplemental electrolyte into said active compartment through said permeable membrane.

16. A galvanic battery comprising an electrochemically active compartment containing an aqueous source of an electrolyte, a cathode and an electrochemically inactive compartment with said electrochemically inactive compartment comprising an elongated strip of flexible tape interconnected as an endless loop extending through said electrochemically active compartment in electrochemical contact with said cathode, said endless loop of flexible tape being composed of an electrochemically inactive substrate containing a solid anode, means for separating said tape into segmented sections of anode, means for advancing said strip of flexible tape through said electrochemically active compartment such that each segment of anode is advanced into said electrochemically active compartment to provide controlled periods of electrochemical activity and contact terminals for coupling said anode and cathode in said electrochemically active compartment.

17. A galvanic battery as defined in claim 16 wherein said flexible tape further comprising a strip of inactive material interconnecting said elongated strip of flexible tape to form an endless loop of flexible tape with said strip of inactive material functioning as a leader for said tape and for separating the tape entering the electrochemically active compartment from spent tape exiting the electrochemically active compartment.

18. A galvanic battery as defined in claim 17 further comprising a supply reel having a rotatable core upon which said strip of tape is wound in a cylindrical configuration to form an inner winding and an outer winding with said inner winding extending outwardly from said core and being connected back to said tape as said outer winding thereof, with the inner winding of tape extending from said core being threaded through said electrochemically active compartment before being connected back as said outer winding.

19. A galvanic battery as defined in claim 18 wherein said elongated strip of flexible tape has a minimum length equal to πD where D represents the outer diameter of the cylindrical winding of flexible tape around said core.

20. A galvanic battery as defined in claim 19 further comprising a divider including wipers for separating said electrochemically active compartment from said electrochemically inactive compartment.

21. A galvanic battery as defined in claim 16 wherein said substrate is porous and includes a source of supplemental electrolyte.

* * * * *